(12) United States Patent
Adams et al.

(10) Patent No.: US 11,165,751 B2
(45) Date of Patent: *Nov. 2, 2021

(54) SYSTEM AND METHOD FOR ESTABLISHING SIMULTANEOUS ENCRYPTED VIRTUAL PRIVATE NETWORKS FROM A SINGLE COMPUTING DEVICE

(71) Applicant: Emerald Cactus Ventures, Inc., Seattle, WA (US)

(72) Inventors: Jesse Aaron Adams, Seattle, WA (US); Christopher Joseph O'Connell, Tucson, AZ (US); Jennifer Marie Catanduanes McEwen, Seattle, WA (US)

(73) Assignee: Emerald Cactus Ventures, Inc., Seattle, WA (US)

( * ) Notice: Subject to any disclaimer, the term of this patent is extended or adjusted under 35 U.S.C. 154(b) by 183 days.

This patent is subject to a terminal disclaimer.

(21) Appl. No.: 15/932,245

(22) Filed: Feb. 16, 2018

(65) Prior Publication Data

US 2018/0234387 A1    Aug. 16, 2018

Related U.S. Application Data

(60) Provisional application No. 62/459,918, filed on Feb. 16, 2017.

(51) Int. Cl.
*H04L 29/06* (2006.01)
*G06F 21/60* (2013.01)
*G06F 21/62* (2013.01)

(52) U.S. Cl.
CPC ........ *H04L 63/0272* (2013.01); *G06F 21/604* (2013.01); *G06F 21/6263* (2013.01); *H04L 63/0281* (2013.01); *H04L 63/0428* (2013.01)

(58) Field of Classification Search
CPC ............. H04L 63/0272; H04L 63/0281; H04L 63/0428; H04L 67/18; H04L 67/02;
(Continued)

(56) References Cited

U.S. PATENT DOCUMENTS 5,778,173 A   7/1998 Apte
6,115,040 A   9/2000 Bladow et al.
(Continued)

FOREIGN PATENT DOCUMENTS

WO    2009137946 A1   11/2009

OTHER PUBLICATIONS

International Search Report & Written Opinion dated May 7, 2018; PCT Application No. PCT/US18/00064; pp. 1-7.
(Continued)

*Primary Examiner* — Shahriar Zarrineh
(74) *Attorney, Agent, or Firm* — FisherBroyles LLP; Kevin D. Jablonski (57) ABSTRACT

System and method for establishing simultaneous zones of control for various communications to and from a computing devices based on specific criteria corresponding to more than one zone of control encompassing similarly-situated network locations. A browser (or any other common term for a networked computing session GUI) executing on a computing device may establish several zones of restricted data interaction based on specific user-defined criteria, thereby establishing simultaneous zones that respectively correspond to one or more specific parameters with regard to networked computer interactions. For example, a first zone may be associated with only other computers located in the United States (as determined by DNS records and the like) and a second zone may be associated with only other computers located with a specific domain (e.g., www.mybusiness.com).

17 Claims, 6 Drawing Sheets

(58) Field of Classification Search
CPC ... H04L 63/18; H04L 12/4675; G06F 21/604;
G06F 21/6263; G06F 21/606; G06F
2221/2107; H04W 4/021; H04W 12/001;
H04W 2/08; H04W 48/16; H04W
12/0806; H04W 12/06; H04W 84/18;
H04W 12/03; H04W 12/08; H04W
12/086
See application file for complete search history.

(56) References Cited

U.S. PATENT DOCUMENTS

| | | | |
|---|---|---|---|
| 6,370,620 B1* | 4/2002 | Wu | G06F 16/9574 711/132 |
| 6,381,644 B2* | 4/2002 | Munguia | G06F 11/0709 709/225 |
| 6,748,418 B1 | 6/2004 | Yoshida et al. | |
| 6,912,573 B2* | 6/2005 | Ohkado | G06F 9/465 709/224 |
| 7,299,267 B1* | 11/2007 | Pedersen | H04L 29/08846 709/217 |
| 7,571,459 B2 | 8/2009 | Ganesh et al. | |
| 8,250,653 B2 | 8/2012 | Wang et al. | |
| 8,266,714 B2* | 9/2012 | Wang | H04L 63/1441 726/29 |
| 8,417,892 B1* | 4/2013 | Roskind | G06F 12/0808 711/133 |
| 8,584,234 B1* | 11/2013 | Sobel | G06F 21/56 726/22 |
| 8,850,010 B1 | 9/2014 | Qureshi | |
| 8,863,252 B1* | 10/2014 | Katzer | H04W 12/128 726/5 |
| 8,868,450 B2 | 10/2014 | Howard et al. | |
| 8,910,277 B1 | 12/2014 | Reis et al. | |
| 8,914,406 B1* | 12/2014 | Haugsnes | H04L 63/0281 707/769 |
| 8,997,187 B2* | 3/2015 | Manton | H04L 63/10 726/4 |
| 9,037,963 B1 | 5/2015 | Chandi et al. | |
| 9,081,956 B2* | 7/2015 | Klein | G06F 21/52 |
| 9,210,157 B1 | 12/2015 | Kim et al. | |
| 9,223,988 B1* | 12/2015 | Dorwin | H04L 47/801 |
| 9,225,690 B1 | 12/2015 | Fitch et al. | |
| 9,232,338 B1 | 1/2016 | Henry et al. | |
| 9,398,017 B1 | 7/2016 | Nizametdinov et al. | |
| 9,560,519 B1* | 1/2017 | McCracken, Jr. | H04W 12/06 |
| 9,807,136 B1* | 10/2017 | Havemose | H04W 12/069 |
| 9,942,198 B2 | 4/2018 | Hoy et al. | |
| 9,964,982 B1 | 5/2018 | Nguyen et al. | |
| 10,574,721 B2 | 2/2020 | Bazzi et al. | |
| 2002/0129281 A1* | 9/2002 | Hatfalvi | H04L 63/08 726/15 |
| 2002/0165909 A1* | 11/2002 | Martin | H04L 69/329 709/203 |
| 2002/0199007 A1* | 12/2002 | Clayton | G06F 8/60 709/230 |
| 2003/0217116 A1* | 11/2003 | Currans | H04L 67/2842 709/218 |
| 2004/0024815 A1* | 2/2004 | Kawase | G06Q 30/02 709/203 |
| 2005/0182824 A1 | 8/2005 | Cotte | |
| 2006/0031412 A1 | 2/2006 | Adams et al. | |
| 2006/0150247 A1* | 7/2006 | Gafken | G06F 21/6281 726/17 |
| 2006/0153122 A1 | 7/2006 | Hinman et al. | |
| 2007/0136579 A1 | 6/2007 | Levy et al. | |
| 2008/0082602 A1 | 4/2008 | Morikawa | |
| 2008/0215675 A1* | 9/2008 | Kaminitz | G06F 21/33 709/203 |
| 2008/0281921 A1 | 11/2008 | Hunt | |
| 2008/0288863 A1 | 11/2008 | Bohannon | |
| 2008/0307519 A1* | 12/2008 | Curcio | H04L 63/0227 726/15 |
| 2008/0313648 A1 | 12/2008 | Wang et al. | |
| 2009/0003368 A1* | 1/2009 | Brown | H04L 63/0272 370/410 |
| 2009/0019361 A1 | 1/2009 | Morris | |
| 2009/0024916 A1* | 1/2009 | Burckart | G06F 16/9577 715/241 |
| 2009/0064279 A1* | 3/2009 | Ardolino | H04L 67/02 726/3 |
| 2009/0210515 A1 | 8/2009 | Fujita et al. | |
| 2009/0240935 A1* | 9/2009 | Shukla | G06F 9/44505 713/100 |
| 2009/0300483 A1* | 12/2009 | Viet | G06F 40/143 715/236 |
| 2010/0049782 A1 | 2/2010 | Li | |
| 2010/0088344 A1* | 4/2010 | Treat | G06F 16/9535 707/794 |
| 2011/0030037 A1 | 2/2011 | Olshansky et al. | |
| 2011/0085667 A1* | 4/2011 | Berrios | H04L 9/321 380/282 |
| 2012/0017094 A1* | 1/2012 | Tulchinsky | G06F 21/6263 713/182 |
| 2012/0023158 A1 | 1/2012 | Kashyap et al. | |
| 2012/0030732 A1 | 2/2012 | Shaty | |
| 2012/0096106 A1 | 4/2012 | Blumofe et al. | |
| 2012/0096511 A1 | 4/2012 | Plummer | |
| 2012/0143866 A1* | 6/2012 | Mameri | G06F 9/445 707/737 |
| 2012/0204286 A1 | 8/2012 | Gingera et al. | |
| 2012/0221932 A1* | 8/2012 | Gleadall | G06F 16/954 715/208 |
| 2012/0240237 A1* | 9/2012 | Kanevsky | G06F 16/957 726/26 |
| 2012/0304286 A1* | 11/2012 | Croll | G06F 21/60 726/22 |
| 2012/0317238 A1 | 12/2012 | Beard | |
| 2013/0014037 A1* | 1/2013 | Fisher | G06F 9/542 715/760 |
| 2013/0042295 A1 | 2/2013 | Kelley et al. | |
| 2013/0174228 A1 | 7/2013 | Etchegoyen et al. | |
| 2013/0247144 A1 | 9/2013 | Marshall et al. | |
| 2013/0311778 A1* | 11/2013 | Cherukuri | H04L 63/0272 713/171 |
| 2013/0340067 A1* | 12/2013 | Lindteigen | H04L 63/0272 726/15 |
| 2014/0006548 A1 | 1/2014 | Tsolis et al. | |
| 2014/0007182 A1 | 1/2014 | Qureshi et al. | |
| 2014/0013103 A1* | 1/2014 | Giladi | H04L 63/0428 713/150 |
| 2014/0032691 A1 | 1/2014 | Barton et al. | |
| 2014/0053238 A1* | 2/2014 | Brannon | H04L 9/3231 726/1 |
| 2014/0074962 A1 | 3/2014 | Kano | |
| 2014/0082140 A1 | 3/2014 | Toussaint et al. | |
| 2014/0090008 A1 | 3/2014 | Li et al. | |
| 2014/0157141 A1 | 6/2014 | Hussain | |
| 2014/0165177 A1* | 6/2014 | Alagha | H04L 63/0272 726/9 |
| 2014/0244623 A1 | 8/2014 | King | |
| 2014/0297437 A1* | 10/2014 | Natarajan | G06Q 30/0635 705/21 |
| 2014/0297937 A1* | 10/2014 | Thomas, III | G06F 12/126 711/103 |
| 2015/0039714 A1* | 2/2015 | Venturi | H04N 21/47217 709/213 |
| 2015/0143223 A1 | 5/2015 | Kolam et al. | |
| 2015/0150113 A1* | 5/2015 | Robb | H04L 63/0281 726/12 |
| 2015/0324479 A1 | 11/2015 | Seidle, Jr. et al. | |
| 2016/0077824 A1 | 3/2016 | Vishnepolsky et al. | |
| 2016/0094560 A1 | 3/2016 | Stuntebeck | |
| 2016/0119342 A1 | 4/2016 | Kus et al. | |
| 2016/0147643 A1* | 5/2016 | Hamon | G06F 11/261 717/134 |
| 2016/0164946 A1* | 6/2016 | Bazzi | G06F 21/53 709/219 |
| 2016/0198012 A1* | 7/2016 | Fablet | H04L 67/26 709/231 |
| 2016/0286394 A1* | 9/2016 | Iyer | H04W 4/021 |

(56) References Cited

U.S. PATENT DOCUMENTS

| | | | |
|---|---|---|---|
| 2016/0328485 A1* | 11/2016 | Dodonov | G06F 16/9574 |
| 2017/0034174 A1 | 2/2017 | Jägers | |
| 2017/0054620 A1* | 2/2017 | Kong | H04L 61/2007 |
| 2017/0085620 A1* | 3/2017 | Swaminathan | H04N 21/6373 |
| 2017/0118215 A1* | 4/2017 | Varadarajan | H04L 67/02 |
| 2017/0118241 A1 | 4/2017 | Call et al. | |
| 2017/0142216 A1 | 5/2017 | Hinde | |
| 2017/0161239 A1* | 6/2017 | Newton | G06Q 30/0241 |
| 2017/0168959 A1* | 6/2017 | Dodonov | G06F 16/9574 |
| 2017/0193221 A1* | 7/2017 | Liu | G06F 16/00 |
| 2017/0238040 A1* | 8/2017 | Huysegems | H04L 67/42 725/116 |
| 2017/0243014 A1 | 8/2017 | Gopalakrishnan | |
| 2017/0353496 A1* | 12/2017 | Pai | H04L 12/4641 |
| 2018/0114014 A1 | 4/2018 | Thompson | |
| 2018/0219849 A1* | 8/2018 | Jones | H04L 67/20 |
| 2018/0234387 A1 | 8/2018 | Adams et al. | |
| 2018/0234396 A1 | 8/2018 | Adams et al. | |
| 2018/0234456 A1 | 8/2018 | Adams et al. | |
| 2020/0084314 A1 | 3/2020 | Mahar et al. | |

OTHER PUBLICATIONS

International Search Report & Written Opinion dated Jun. 1, 2018; PCT Application No. PCT/US18/00063; pp. 1-8.
International Search Report & Written Opinion dated May 7, 2018; PCT Application No. PCT/US18/00068; pp. 1-7.
"International Search Report & Written Opinion"; dated May 7, 2018; PCT/US18/00067; filed Feb. 16, 2018; pp. 1-9.

* cited by examiner

SYSTEM AND METHOD FOR ESTABLISHING SIMULTANEOUS ENCRYPTED VIRTUAL PRIVATE NETWORKS FROM A SINGLE COMPUTING DEVICE

PRIORITY CLAIM

This application claims the benefit of U.S. Provisional Application No. 62/459,918, entitled "SYSTEM AND METHOD FOR ESTABLISHING SIMULTANEOUS ENCRYPTED VIRTUAL PRIVATE NETWORKS FROM A SINGLE COMPUTING DEVICE" filed Feb. 16, 2017, which is incorporated by reference in its entirety herein for all purposes.

BACKGROUND

Computing devices, such as mobile phones, tablet computers, laptop computers and desktop computers, are often configured to connect to a computer network to communicate with other computing devices. Such is the case with the Internet and any proprietary internal computing network. Standards have been established that allow communications to be shared by all computing devices in a specific network and to ensure that network traffic is routed correctly. Further, public and private networks may coexist such that computing devices may communicate both within and outside of any private network using a public network, such as the Internet.

An administrator of a private communication network may control how and when outside computing devices may establish a connection as well as when internal devices may establish connections outside of private network. Even though a computing device may be physically separated from a private network, the private network may be extended through the public network in a virtual manner by requiring specific communication protocols and credentials prior to establishing the virtual private connection. Thus, a private network may be extended as a virtual private network through the Internet.

Vulnerabilities and privacy concerns abound when using an established existing virtual private networks. Various applications that use network communications may be given access to data caches and memory of the local computing device and unrelated applications on the client device, despite having no authorization, may access the data caches, memory or even the underlying virtual private network. Such data caches and memory may contain data and meta data that may be sensitive or private, and the virtual private network may contain sensitive or private information and resources. As a simple example, when using a search website, an individual may browse to a page offering solutions to a slightly embarrassing health issue. When the user subsequently browses to a shopping website, an advertisement may appear for the product to cure said embarrassing health issue. Advertising software (either from the shopping website itself, or distributed by a third party) is able to see a browsing history (or other tracking techniques, such as beacons) from the computing device used. There are ways to prevent this, but current solutions typically require a great amount of functionality to be disabled (e.g., cookies, handshakes, and the like), require significant user expertise and add significant user experience complexity.

BRIEF DESCRIPTION OF THE DRAWINGS

Aspects and many of the attendant advantages of the claims will become more readily appreciated as the same become better understood by reference to the following detailed description, when taken in conjunction with the accompanying drawings, wherein:

DETAILED DESCRIPTION

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

By way of an overview, the subject matter disclosed herein may be directed to a system and method for establishing simultaneous zones of control for various communications to and from a computing devices based on specific criteria corresponding to more than one zone of control encompassing similarly-situated network locations. Broadly speaking, when a user of a device engages a networked computing environment of any kind, a great deal of data may be sent from the user's device as well as downloaded to the user's device. These "data interactions" are numerous and may include obvious examples such as requesting specific data from websites (e.g., browsing to a website), but also includes less obvious examples, such as history data, DNS data, GPS location data, cookies, browsing history, search history, phone records, online communications history, and much more. In essence, without any restrictions, any data stored in a device or transiently generated on a device may be taken from the device during any networked computing session.

In this patent application, a browser (or any other common term for a networked computing session GUI) executing on a computing device may establish several zones of restricted data interaction based on specific user-defined criteria. As called hereinafter, the Tenta™ browser is a private encrypted browser that allows a user of the computing device to establish simultaneous zones that respectively correspond to one or more specific criteria with regard to networked computer interactions. For example, a first zone may be associated with only other computers located in the United States (as determined by DNS records and the like) and a second zone may be associated with only other computers located with a specific domain (e.g., www.my-business.com). Further each established zone may also establish a separate and distinct virtual private network (VPN) connection for the respective set of zones. Each VPN may be established simultaneously and utilize separate encryption. In such an established and zoned interaction environment, data that is free to be shared in one zone will not be free to be shared in any other zone. Thus, one may establish a VPN using encrypted communications for a work session with a specific domain in the second zone without allowing any browsed website in the first zone to gain access to data within the second zone. These and other aspects are discussed in conjunction with FIGS. 1-6 below.

Figure 1:
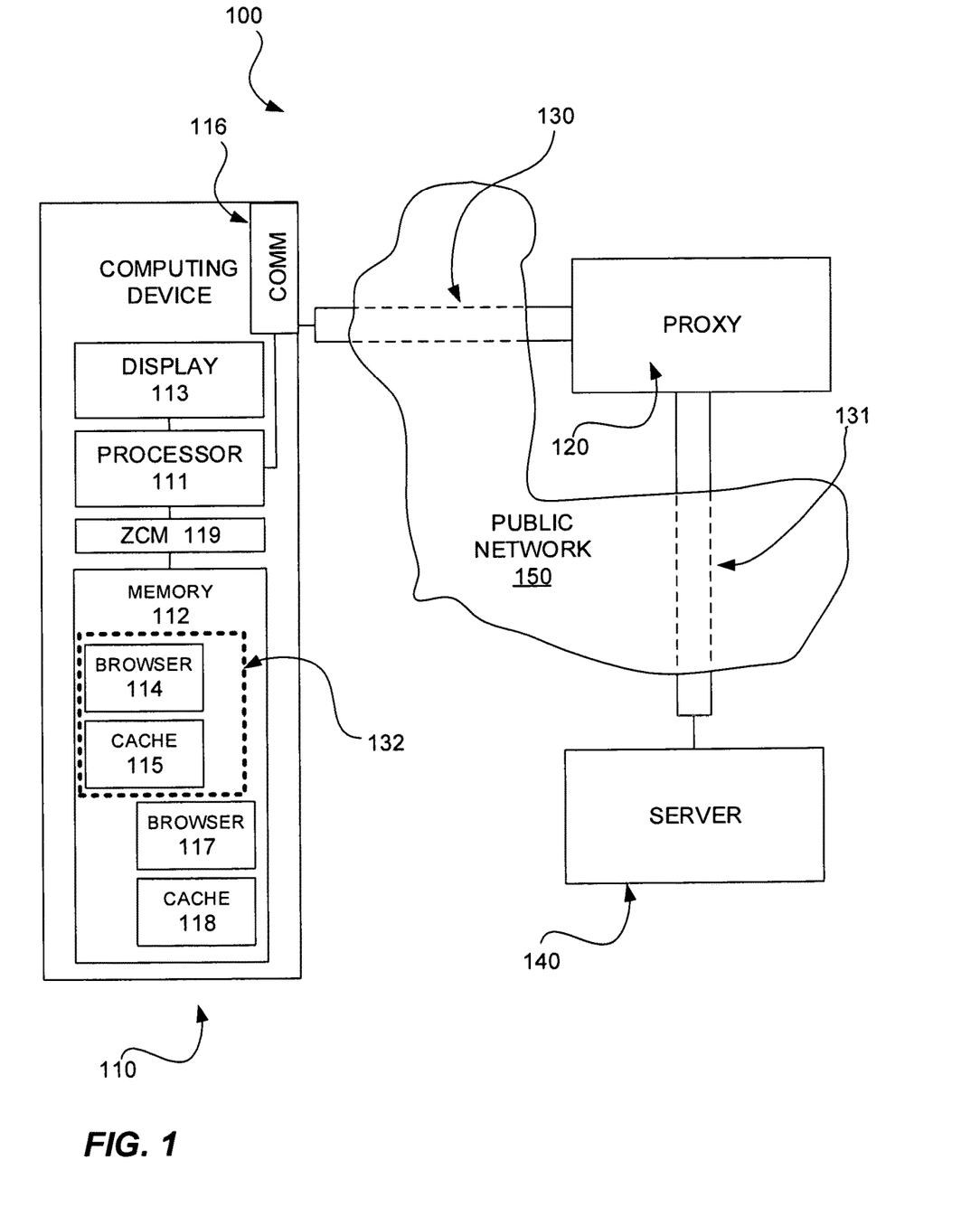
FIG. 1 is a diagram of a system for facilitating communications between a computing device and a server computer using a single zone for encrypted communications through a public network according to an embodiment of the subject disclosed herein.

FIG. 1 is a diagram of a system 100 for facilitating communications between a computing device 110 and a server computer 140 using a single zone 130 for encrypted communications through a public network 150, according to an embodiment of the subject disclosed herein. The computing device 110 may be any computing device capable of electronically communicating with a common public network 150 such as the Internet. The computing device includes a processor 111, a memory, 112, and a display 113. Further, the computing device 110 may be configured to execute an application or set of applications for facilitating communications between the computing device and any remote server computer 140 (e.g., a web server). Various applications and sets of applications may be stored in various logical delineations within the memory 112.

The computing device 110 may include several additional components, as discussed below with respect to FIG. 6. Generally, the computing device 110 may be one or more of: a mobile computing device, a laptop computer, a tablet computing device, a desktop computer, a rack computer, a mobile phone, a personal data assistant, and the like.

Communications may be routed through one or more proxy server computers 120. In computer networks, a proxy server 120 is a server (a computer system or an application) that acts as an intermediary for requests from clients seeking resources from other servers. Clients (such as computing device 110) connect to the proxy server 120 to request some service, such as a file, connection, web page, or other resource available from a different server (such as server 140). The proxy server 120 evaluates the request as a way to simplify and control the interaction, as well as encapsulate and possibly encrypt the data channel. Today, most proxies are web proxies, facilitating access to content on the World Wide Web and providing anonymity, or VPN servers, providing encryption and security.

The computing device 110 may include a browser module 114 (sometimes called a Tenta™ Browser) or related software for web browsing (commonly referred to as a browser) formed according to one or embodiments in this disclosure. Such a browser 114 is a software application for retrieving, presenting, and traversing information resources on a public computer network, such as the Internet. An information resource may be identified by a Uniform Resource Locator (URL) and may be a web page, image, video or other piece of content. A computer language, such as Hypertext Markup Language (HTML), may be used to create web pages with hyperlinks or other navigational methods that enable users to easily access related resources using their browser software. Although browsers primarily access websites on the Internet, they can also be used to access web servers in private networks; files in file systems; data in ephemeral or secret networks, such as Tor; consensus schemes such as blockchains; or distributed schemes such as InterPlanetary File System (IPFS). The browser 114 may have a dedicated cache 115 associated only with this browser 114 realized in the overall memory space 112.

The browser 114 facilitates communication between the computing device 110 and a server computer 140 through a communication module 116 (e.g., a network interface adapter) in the computing device 110. This communication session may be encrypted through use of a virtual private network (VPN) 130. Such a connection is sometimes called a VPN tunnel, as all communications through this communication channel may be encrypted to realize greater security. The VPN 130 may include a second portion 131 that facilitates encrypted communication between a proxy server 120 and a server computer 140. In other embodiments, the communications may be unencrypted to realize the encapsulation benefits of a VPN while still providing transparency for auditing or compliance.

In the Internet addressing architecture, a private network is a network that uses private IP address space, following the standards set by RFC 1918 for Internet Protocol Version 4 (IPv4), and RFC 4193 for Internet Protocol Version 6 (IPv6). These addresses are commonly used for home, office, and enterprise local area networks (LANs). Addresses in the private space are not allocated to any specific organization and anyone may use these addresses without approval from a regional Internet registry. However, IP packets addressed from private networks generally cannot be transmitted through the public Internet. As a result, a private network can only connect to the Internet via a network address translator (NAT) gateway, a proxy server or a router.

There are good and valid reasons why it is often perilous to use addresses outside of the RFC 1918 or RFC 4193 space for a private or internal network. However, the embodiments of the systems and methods described are not restricted to private address space. Instead, any valid IP address may be encapsulated inside the VPN tunnel 130/131. There may be reasons to use such risky addresses, such as to overlay a well-known public IP with an internal version providing a similar service but with different data or privacy guarantees.

Network Address Translation (NAT) is a method of remapping one IP address space into another by modifying network address information in Internet Protocol (IP) datagram packet headers while they are in transit across a traffic routing device. The technique was originally used to ease routing traffic in IP networks without requiring every host to receive a new address. NAT has grown to become a popular and essential tool in conserving global address space allocations due to IPv4 address exhaustion. NAT shares one or a few Internet-routable IP address of a NAT gateway for an entire private network. Computers in a private network may connect to public networks and share communications using network address translation for public network communications. Even when addresses are plentiful, NAT amalgamates all of the communications from devices behind the public IP, making it difficult for other entities on the public network to distinguish between entities behind the NAT.

A VPN 130/131 is a private network that extends across a public network or the Internet 150. It enables users to send and receive data across shared or public networks as if their computing devices were directly connected to a single private network or multiple contiguous private networks. Some VPNs 130/131 allow employees to securely access a corporate intranet while located outside the office. Other VPNs 130/131 can securely connect geographically separated offices of an organization, creating one integrated network. Individual Internet 150 users can use some VPNs 130/131 to secure their transactions while on wireless networks, to circumvent geo-restrictions and censorship, and/or to connect to proxy servers 120 to protect their personal identity and location.

A VPN 130/131 is created by establishing a virtual point-to-point or point-to-multipoint connection through the use of dedicated connections, virtual tunneling protocols, or traffic encryption. A VPN 130/131 available from the public Internet 150 can provide some of the benefits of a wide area network (WAN). A VPN 130/131 user may remotely access the resources available within the private network. A VPN 130/131 facilitates encrypted, authenticated, or encrypted and authenticated communications between computing devices.

Encryption is the process of encoding messages or information so that only authorized parties can read the encrypted contents. Encryption does not prevent interception, but it denies the message content to a would-be eavesdropper. Encryption uses cryptographic algorithms to render a plaintext into a format that is not readable by those who do not possess the decryption key. It is possible to decrypt the message without the key, but unauthorized decryption requires very significant skill and large computational resources. An authorized recipient can easily decrypt the message with the key provided by the sender. An ideal cryptosystem renders the ciphertext indistinguishable from random noise. Practical cryptosystems approach this limit.

Authentication is the process of determining that the actual recipient of the message is the intended recipient. Authentication uses cryptographic algorithms to prove identity and is an important part of establishing a secure connection. Encryption by itself ensures that only the two (or more) parties exchanging messages can read the messages. Authentication ensures that the other parties are the intended recipients, rather than an attacker.

Encryption and authentication provide the strongest protections when combined together. Such combination ensures that information is readable only by the other party (or parties) and that the other party is indeed the desired sender or recipient. Combined encryption and authentication are the most common methods of using cryptography in network communications, however there are some occasions where it may be desirable to use encryption or authentication by themselves.

The combination of encryption and authentication ultimately provides four major modes of operation: (1) unencrypted, (2) encrypted but not authenticated, (3) authenticated but not encrypted, and (4) encrypted and authenticated. Further examples primarily relate to the most common encrypted and authenticated case, but nothing prevents any of these embodiments and systems from working with any of the four modes.

FIG. 1 illustrates a single computing device 110 communicating with one server computer 140 through a single VPN 130/131. This individual VPN 130/131 in FIG. 1 may be designated as a zone of control (or simply "zone"). Zones may be established and facilitated through a Zone Control Module 119. Various zones may be uniquely associated with a specific VPN. In the example of FIG. 1, zone 132 allows communications between the computing device 110 and the server computer 140 in a private encrypted manner through VPN 130/131. The encrypted zone 132 of communications may be isolated from other communications with the computing device 110. Thus, a different browsing session using a different browser 117 (and using a different associated cache 118) may use a non-encrypted, non-private communication path that is isolated from the encrypted zone 132. As a result, communications that utilize the encrypted zone 132 are cached in a memory space 115 not accessible by any other application on the computing device 110. That is, the browser 114 and associated cache 115 are mutually exclusive from the browser 117 and associated cache 118.

A user may permit use of an established zone 132 on an application-by-application basis. For example, a user may configure a cloud music player to utilize a first zone 132 configured to use any local internet connection. A user may also configure a cloud movie player to establish a second VPN using a second zone (for example, a zone associated with browser 117 and cache 118) that connects to a second server (not shown in FIG. 1). Thus, setting use of zones through Zone Control Module 119 may be established by a user based upon a user-generated customized distinction among the one or more external computing devices.

Several other delineations of remote servers may be possible. One such distinction is establishing a zone of control based upon a geographic distinction among the one or more external computing devices. For example, websites that are within a user's pre-established geographic region (e.g., a United States server for a United States account), may be designated as part of an established zone of control. A further distinction may be based upon a domain-level logical delineation. For example, the computing device may be established as part of a domain, but operated remotely such that use of a banking application that only connects over a VPN to a network server operated or audited by the bank may realize domain level security.

A user may permit use of a zone 132 on a URL-by-URL basis. A user can establish a custom set of rules for various specified sites. For example, a user provides that website example.com can only be accessed through Zone 1 132. When the user opens the URL example.com/xyz, it will always perform communication in Zone 1 132. As another example, the user can prohibit the saving of any data from a particular domain in one zone 132 while allowing it in another (not shown in FIG. 1). This may be used, for instance, to view a website as a logged in user in one zone 132, while viewing it as a non-logged in user in a different zone (not shown in FIG. 1).

The use of an encrypted VPN 130/132 within a zone of control 132 may be extrapolated to several logical distinctions of communication between the computing device and other remote server computers as is discussed in the example embodiments. Further more than one simultaneously-instantiated encrypted VPN 130/132 and associated zone of control 132 may also be realized as described in follow-on embodiments of FIGS. 2-4 described next.

Figure 2:
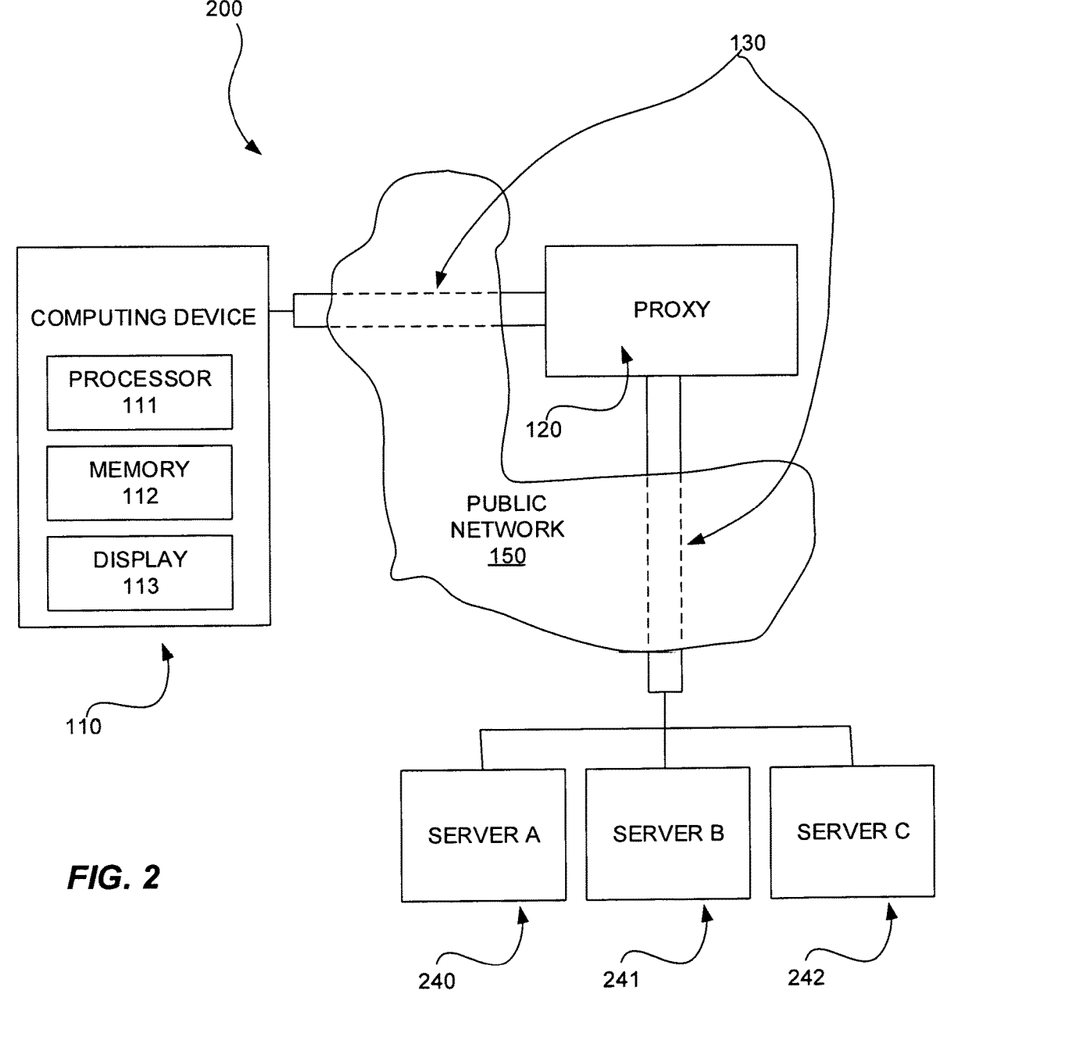
FIG. 2 is a diagram of a system for facilitating communications between a computing device and a group of server computers using a single zone for encrypted communications through a public network according to an embodiment of the subject disclosed herein.

FIG. 2 is a diagram of a system 200 for facilitating communications between a computing device 110 and a group of server computers 240, 241, and 242 using a single zone 132 for encrypted communications through a public network 150, according to an embodiment of the subject disclosed herein. It is commonly understood that a "server computer" may mean either a single physical server, or a logical grouping of physical servers. For example, multiple physical computers may be used for high availability, disaster recovery, load balancing, and the like. In all of these diagrams, server computer includes either a single physical or virtual computer, or a collection of servers operating as a single logical unit.

A user may configure the use of a zone 132 on a VPN-by-VPN basis. For example, a user establishes permission for communication based on an encrypted (but not authenticated) connection. Alternatively, a user establishes permission based on an authenticated, but not encrypted, connection. That is, the user wishes to make the contents of his communication public (as a matter of free speech, auditing, public record, and the like), but the user also wishes to ensure that the intended party may prove who sent the message. More commonly, a user establishes permission based on an encrypted and authenticated connection.

In the example of FIG. 2, the zone 132 may be established for using the VPN 130/131 to provide encrypted communication to each of the servers 240, 241, and 242. In other embodiments, however, the zone 132 may be established for using the VPN 130/131 to provide encrypted communication to at least one, but less than all, of the servers 240, 241, and 242. In the case of an excluded server (for example server 242), communications may be still occur through VPN 130/131, but communications may not be encrypted in the context of the established zone 132 and any data stored at the computing device will be stored outside of cache 115. Further still, communications to and from an excluded server (server 242 using the previous example) may also occur outside of the VPN 130/131, through a separate communication link not specifically shown in FIG. 2.

Figure 3:
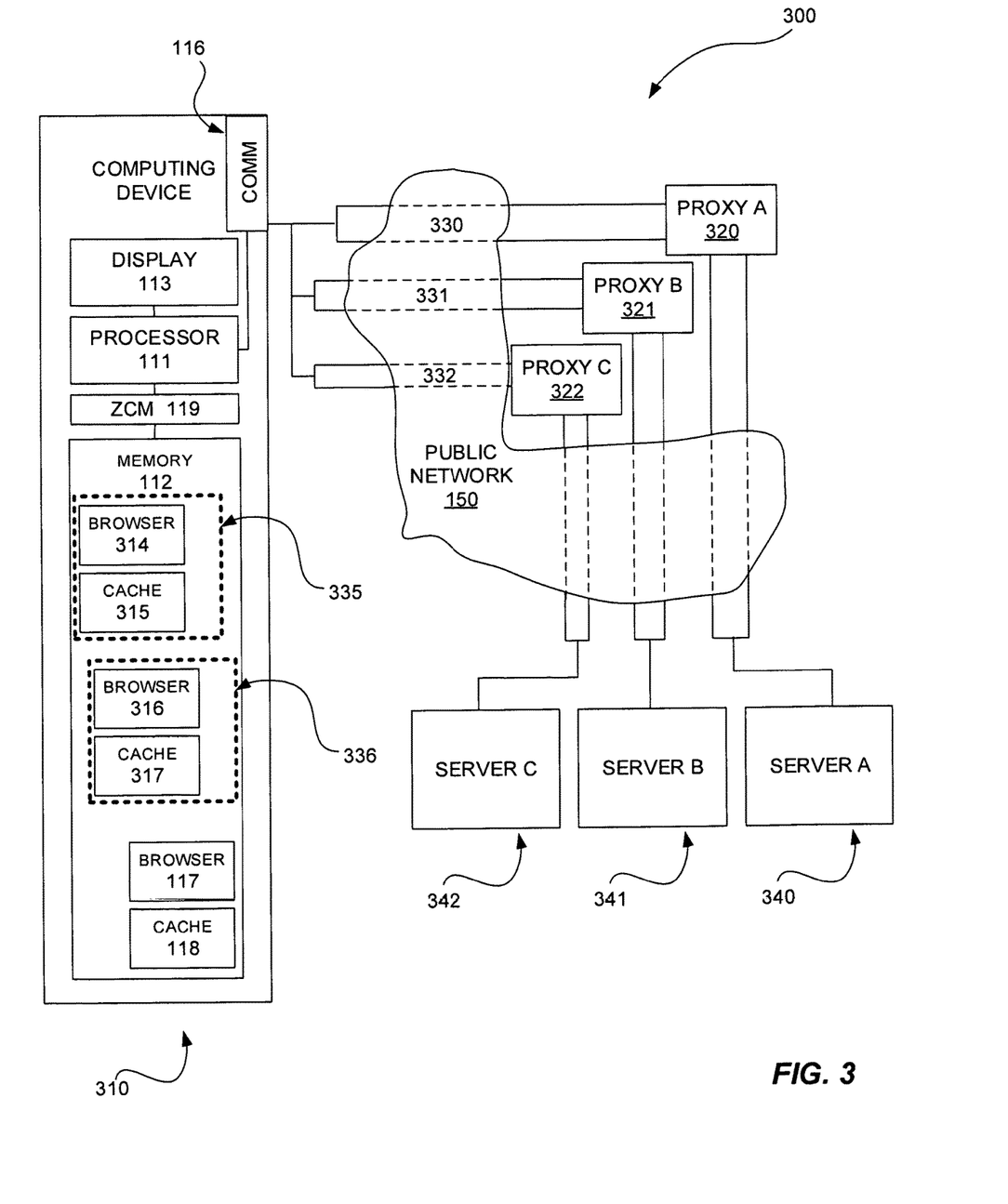
FIG. 3 is a diagram of a system for facilitating communications between a computing device and more than one server computer using a more than one zone for encrypted communications through a public network according to an embodiment of the subject disclosed herein.

FIG. 3 is a diagram of a system 300 for facilitating simultaneous encrypted communications between a computing device 110 and more than one server computer 340, 341, and 342, using more than one zone 335 and 336, for encrypted and isolated communications through a public network 150, according to an embodiment of the subject disclosed herein. In this embodiment, a single computing device 110 may have three separate and discrete encrypted browsing VPN sessions (330, 331, and 332) via three distinct proxies (320, 321, and 322) to three different server computers (340, 341, and 342).

In this manner, a first private encrypted browsing session (with browser 314 and associated cache 315) may be established using a first zone 335 with communications through a first VPN 330 to a first server computer 340. Similarly, a second private encrypted browsing session (with browser 316 and associated cache 317) may be established using a second zone 336 with communications through a second VPN 331 to a first server computer 341. Also related, a third browsing session (with browser 117 and associated cache 118) may be established using a non-encrypted, non-private communication path exclusive of the simultaneously instantiated encrypted zones 335 and 336 with communications through a third channel 332 to a third server computer 342. In this example, each private encrypted session may be isolated from every other private encrypted session as well as isolated from any non-encrypted public sessions (e.g., channel 332). Further, additional sessions that may or may not be private or encrypted may be established in a similar simultaneous manner.

Figure 4:
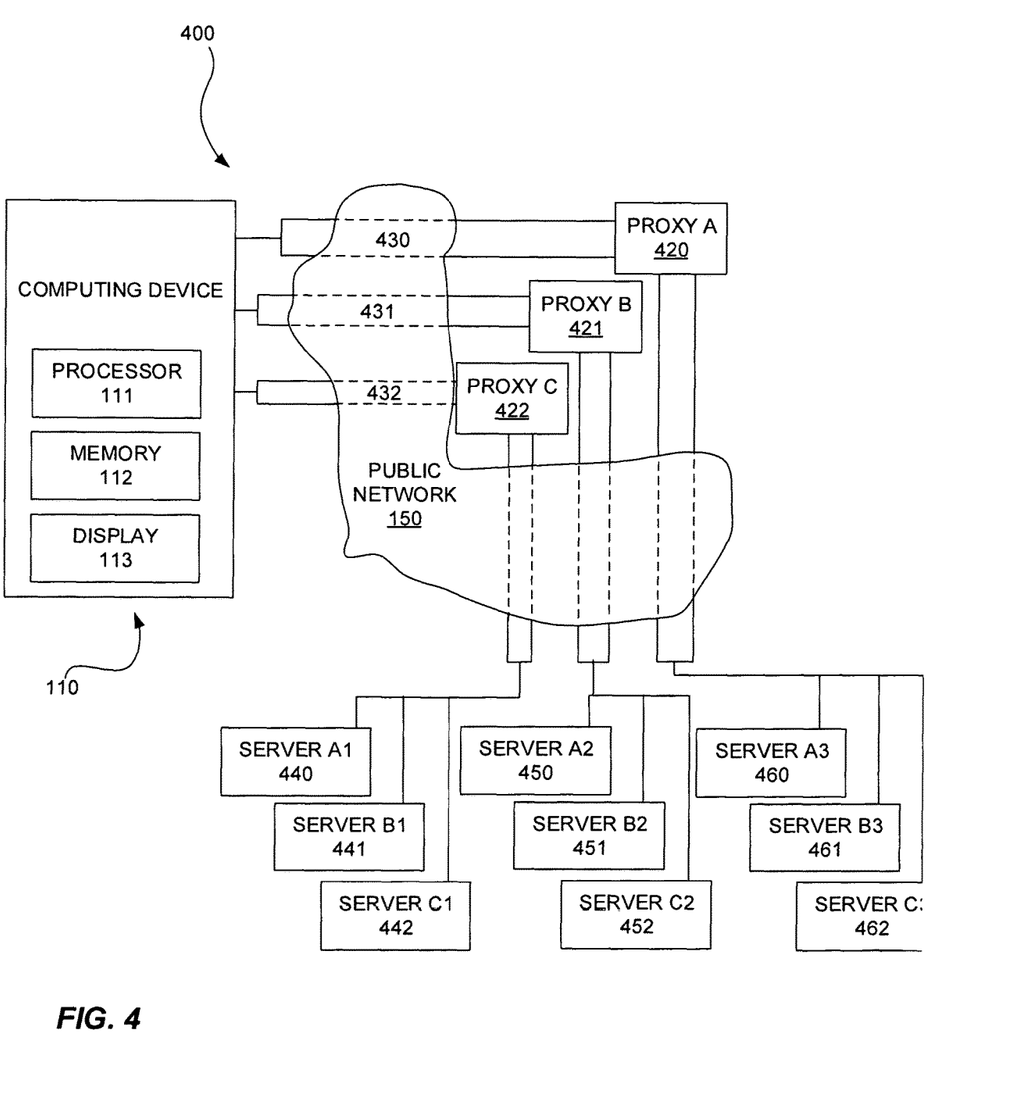
FIG. 4 is a diagram of a system for facilitating communications between a computing device and more than one group of server computers using a more than one simultaneously instantiated zone for encrypted communications through a public network according to an embodiment of the subject disclosed herein.

FIG. 4 is a diagram of a system 400 for facilitating communications between a computing device 110 and more than one group of server computers, using more than one zone for encrypted communications through a public network 150, according to an embodiment of the subject disclosed herein. In this embodiment, a single computing device 110 may have three separate and discrete encrypted browsing VPN sessions (430, 431, and 432) using three distinctive zones 435, 436, and 437 via three distinct proxies (420, 421, and 422) to three different groups of server computers; e.g., a first group of server computers (440A, 440B, and 440C), a second group of server computers (441A, 441B, and 441C), and a third group of server computers (442A, 442B, and 442C).

A user may permit use of a zone on a geographical-location-by-geographical location basis. For example, a user may have one zone connected to a server in Seattle and a second zone connected to a server in the UK. Each zone may then have permission rules based on the specific server location, such as only allowing certain types of files or sites to load from that zone.

A user may also permit use based on the sites to which a zone may connect. Thus, a zone connected to a server in the US might only allow US-based sites to connect. Furthermore, a company may establish a zone connected to the company's server in Seattle, then only allow access to sites whitelisted by that company, and only provide access to the company VPN server to employees of the company. More than one zone may be created and more than one set of parameters may be applied to each zone, creating a wide array of possible combinations rules and control.

Although the connections between the computing device, the proxy and the final server are shown as single encrypted links in FIG. 1-4, these links may be made of one or more links on either public or private network, and many such links may be strung together to create logical links.

Although only one proxy server is shown between the computing device and the final server in FIG. 1-4, multiple proxies may be strung together to create longer networks.

Figure 5:
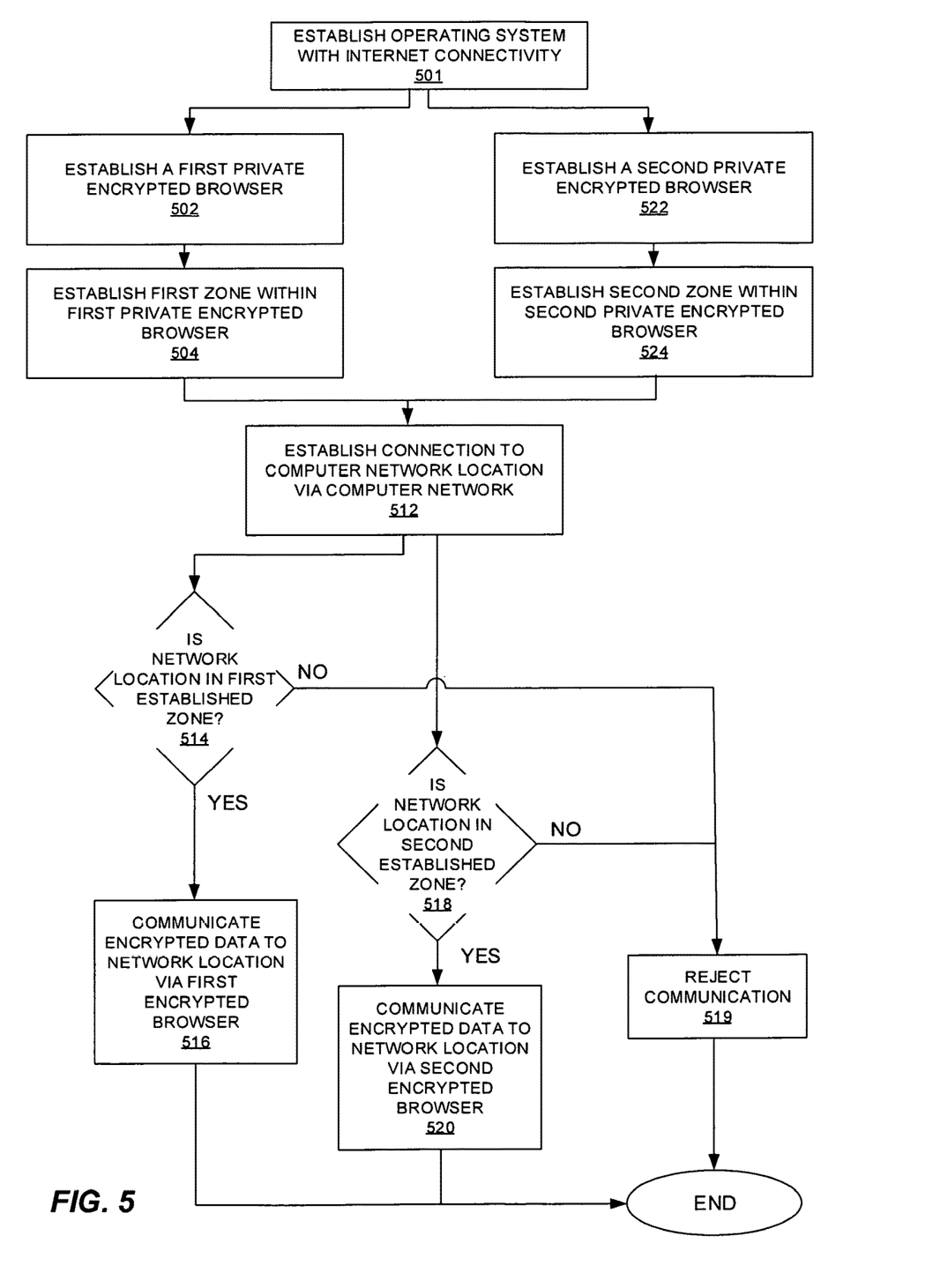
FIG. 5 is a flow diagram of a method for establishing simultaneous zones with simultaneous encrypted browsing sessions for encrypted communications through a public network according using according to an embodiment of the subject disclosed herein.

FIG. 5 is a flow diagram of a method for establishing simultaneous zones with simultaneous encrypted browsing sessions for encrypted communications through a public network according to an embodiment of the subject disclosed herein. Such simultaneous encrypted VPN sessions may be established within the same operating system executing on a mobile computing device (or any computing device) such that each VPN connection is maintained even when one of the VPN connections is experiencing communicative data traffic. In this method, a single executing operating system may be instantiated at a user computing device at step 501.

Then, simultaneous paths to the method may be accomplished wherein a first private encrypted browser is established within the instantiated operating system at step 502. A first private encrypted zone may then be created based on one or more parameters at step 504 such that the first private encrypted zone defines which communications will be isolated from all other communications inside the first private encrypted zone using the first private encrypted browser. Similarly, and simultaneously, a second private encrypted browser is established within the instantiated operating system at step 522. Then, a second private encrypted zone may be created based on one or more different parameters at step 524 such that the second private encrypted zone defines which communications will be isolated from all other communications inside the second private encrypted zone using the second private encrypted browser. As used herein, the simultaneous nature of these two private encrypted sessions means that these sessions may execute at exactly the same time, or may interleave with one another such that both appear to be logically running at the same time, even though physical hardware may achieve this by successively scheduling executions in the first zone then scheduling executions in the second zone (e.g., a logically-distinct multi-threaded system).

At step 512, after the two private encrypted zones are established, the computing device may establish connection to one or more remote server computing devices across a computer network (e.g., the Internet or the like). As communication from the connection ensue each instantiated browser may analyze one or more aspects of the respective communications to determine if the communication is within a respective zone of control. That is, at step 514, the first private encrypted browser determines if the network location of the communication (or other aspects of the communication such as content type or the like) is within the first private encrypted zone. If yes is the answer, then the communication proceeds through the first private encrypted zone and the first private encrypted browser as allowed and isolated traffic at step 516. If the answer here is no, then the communication is rejected at step 519 for passing through the first private encrypted zone and will remain isolated from all other communication through the first private encrypted zone. Similarly, at step 518, the second private encrypted browser determines if the network location of the communication (or other aspects of the communication such as content type or the like) is within the second private encrypted zone. If yes is the answer, then the communication proceeds through the second private encrypted zone and the second private encrypted browser as allowed and isolated traffic at step 520. If the answer here is no, then the communication is also rejected at step 519 for passing through the second private encrypted zone and will remain isolated from all other communication through the second private encrypted zone.

All decisions about all traffic may occur simultaneously, Further, the simultaneous zones may be nested zones such that the first private encrypted zone may be wholly part of the second private encrypted zone such that some communications will meet the parameters of both private encrypted zones while other communications will only meet the parameters of the second private encrypted zone thereby remaining isolated from the first zone. The various parameters for establishing the simultaneous zones are described next.

In an embodiment, one parameter may be a timestamp parameter. Such a parameter may be based upon a timestamp of when communications are received at the local computing device. That is, the zone of control may established to isolate all communications occurring within period of time having a start time and end time, e.g., all communications between 8 PM and 10 PM as defined by the local time of the local computing device. This allows a user to isolate all network traffic during the specific time such that a browsing session outside of the specific time will not have network traffic subject to the established zone of control. In other embodiments, the timestamp may be based on when the underlying content was created in the communicated data. In still other embodiments, the timestamp may be a local time at the external computing device (e.g., server time) of when the data is sent.

In another embodiment, one parameter may be a top-level domain parameter. Such a parameter is based upon the top-level domain designation of the external computing device network location. Such designation may include .com, .gov, .net, and the like. With this parameter established, network traffic may be isolated within the zone of control to all network traffic from one top-level domain to the exclusion of all other top-level domains.

In another embodiment, one parameter may depend on the network address block (1.2.3.0/24, for example) or autonomous system number (AS123 for example) of either the computing device or the destination network, or both. With this parameter established, network traffic may be isolated within the zone of control to all network traffic with the specified origin network, destination network, or origin and destination network to the exclusion of all other networks.

In another embodiment, one parameter may be a time of day relative to a specific geographic location. Such a parameter may be based upon the time of day of the target network location. Alternatively, the time of day designation may be based on the location of the device that will be accessing the target network location. In yet another embodiment, the time of day may be based on a specific time zone, such as Greenwich Mean Time. Further yet, various target locations may shift between zones based on time of day. For example, a target location may be part of a first zone during AM hours and part of a different zone during PM hours.

In another embodiment, a user may assign a specific URL to a specific zone as one of the parameters. In one embodiment, a specific URL may be the entire designated zone. Such a single URL zone may be useful for streaming services that deliver a massive amount of content.

In another embodiment, a user may assign specific content to a specific zone. In one embodiment, a specific designation of content may be the entire designated zone. For example, the user may assign all files with a particular extension (.mp3) or even all files of a general type (all types of video files) to be designated as traffic for a dedicated zone. Such a single content zone may be useful for streaming services that deliver a massive amount of content.

In another embodiment, a user may assign a specific set of target locations based upon ownership of the target locations to a specific zone. In one embodiment, a specific set of target locations may all be owned by a single entity (e.g., all network target locations owned by a conglomerate corporation) and then may be designated as the entire designated zone.

In another embodiment, a user may assign a specific set of target locations based upon geographic locations of the target locations to a specific zone. In one embodiment, a specific set of target locations may all be within a single geographic region (e.g., all network target locations within North America or within Delaware) and then may be designated as the entire designated zone.

In another embodiment, a user may assign a specific set of target locations based upon designation of any manner of previous interaction of the target locations to a specific zone. In one embodiment, a specific set of target locations may all be known network locations (e.g., target locations previously browsed to) and then may be designated as the entire designated zone.

In another embodiment, a user may assign a specific set of target locations based upon designation of usage of the target locations to a specific zone. In one embodiment, a specific set of target locations may all be known network locations that have been used to a large degree (e.g., target locations often browsed to) and then may be designated as the entire designated zone.

In another embodiment, a user may assign a specific set of target locations based upon designation of current network connectivity parameters. In one embodiment, a specific set of target locations may all be known network locations (e.g., target locations previously browsed to and used for large data transfer) and then may be designated as being part of a zone based on whether the device being used for browsing is connected to a network through a Wi-Fi connection, a cellular connection, a dial-up modem connection, or the like.

The various parameters as discussed above may be combined as a group of two or more parameters to establish various zones as a user may loop back at step 506 to select secondary, tertiary, etc., parameters. For example, additional selections at step 506 may include additional parameters of a similar type (8 am-12 pm and 1 pm-5 pm) or of a dissimilar type (8 am-5 pm and .gov) or any combination of any of the parameters discussed herein.

The various criteria as discussed above may be combined as a group of two or more criteria to establish various zones.

Figure 6:
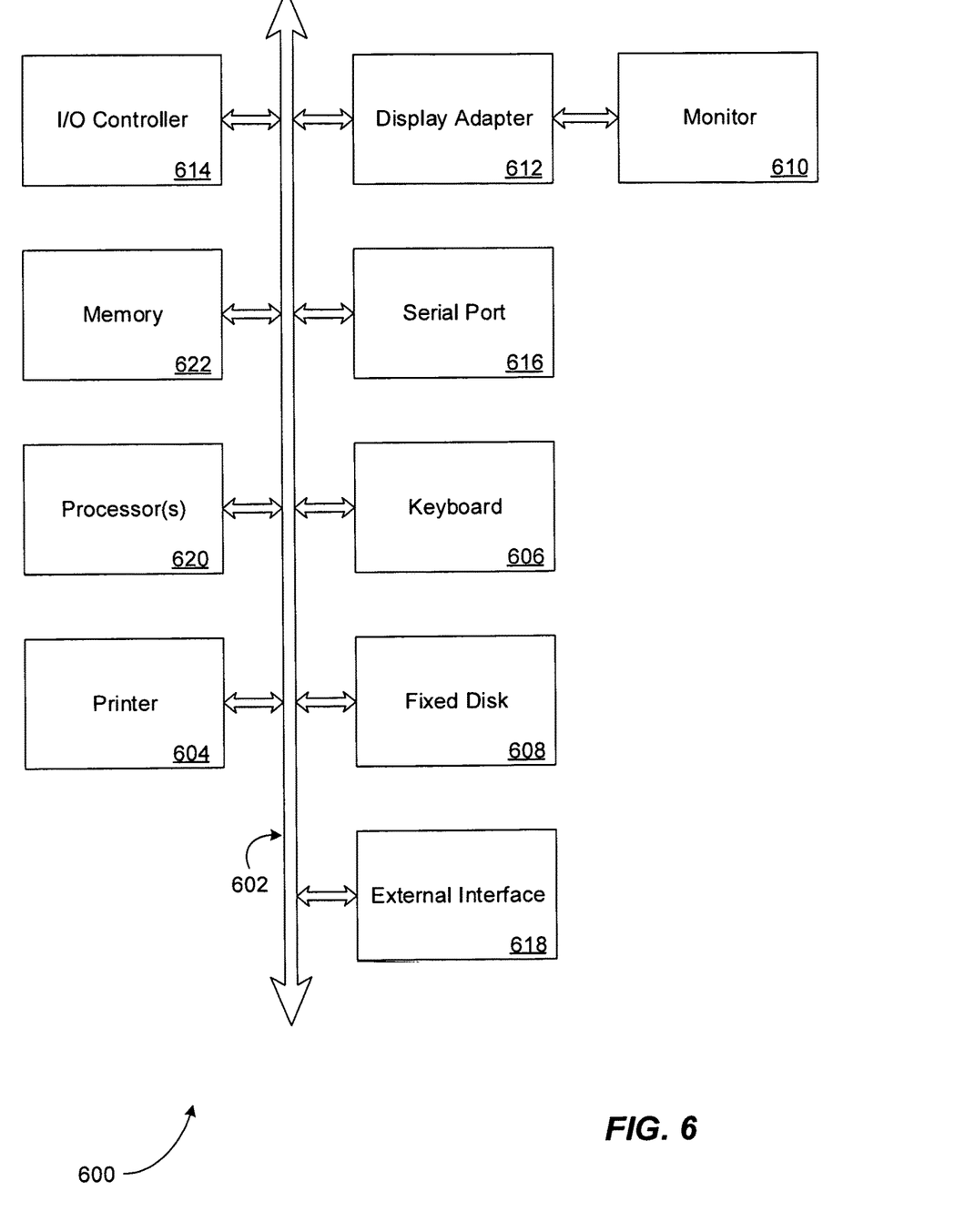
FIG. 6 is a block diagram of the computing device that is suitable for realizing the facilitations of communications depicted in FIGS. 1-4 according to an embodiment of the subject disclosed herein.

FIG. 6 is a block diagram of the computing device that is suitable for realizing the facilitations of communications depicted in FIGS. 1-4 according to an embodiment of the subject disclosed herein. FIG. 6 and the following discussion are intended to provide a brief, general description of a suitable computing environment in which the subject matter disclosed herein may be implemented. Although not required, aspects of the systems and methods described herein may be practiced in the general context of computer-executable instructions, such as program modules, being executed by a computer device. Generally, program modules include routines, programs, objects, components, data structures, and the like, that perform particular tasks or implement particular abstract data types. Such program module may be embodied in both a transitory and/or a non-transitory computer readable medium having computer-executable instructions. Moreover, those skilled in the art will appreciate that the systems and methods herein may be practiced with other computer system configurations, including handheld devices, smart watches, cellular or mobile telephones, smart phones, tablet computing devices, multiprocessor systems, microprocessor-based or programmable consumer electronics, network personal computers, minicomputers, mainframe computers, distributed computing systems, cloud computing systems, and the like. The systems and methods herein may be practiced in distributed computing environments where tasks are performed by remote processing devices that are linked through a communications network. In a distributed computing environment, program modules may be located in both local and remote computing devices.

FIG. 6 is a diagram illustrating elements or components that may be present in a computer device or system configured to implement a method, process, function, or operation in accordance with an embodiment. In accordance with one or more embodiments, the system, apparatus, methods, processes, functions, and/or operations for enabling efficient configuration and presentation of a user interface to a user based on the user's previous behavior may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 6 is a diagram illustrating elements or components that may be present in a computer device or system 600 configured to implement a method, process, function, or operation in accordance with an embodiment. The subsystems shown in FIG. 6 are interconnected via a system bus 602. Additional subsystems include a printer 604, a keyboard 606, a fixed disk 608, and a monitor 610, which is coupled to a display adapter 612. Peripherals and input/output (I/O) devices, which couple to an I/O controller 614, can be connected to the computer system by any number of means known in the art, such as a serial port 616. For example, the serial port 616 or an external interface 618 can be utilized to connect the computer device 600 to further devices and/or systems not shown in FIG. 6 including a wide area network such as the Internet, a mouse input device, and/or a scanner. The interconnection via the system bus 602 allows one or more processors 620 to communicate with each subsystem and to control the execution of instructions that may be stored in a system memory 622 and/or the fixed disk 608, as well as the exchange of information between subsystems. The system memory 622 and/or the fixed disk 608 may embody a tangible computer-readable medium.

It should be understood that the present disclosure as described above can be implemented in the form of control logic using computer software in a modular or integrated manner. Based on the disclosure and teachings provided herein, a person of ordinary skill in the art will know and appreciate other ways and/or methods to implement the present disclosure using hardware and a combination of hardware and software.

Any of the software components, processes or functions described in this application may be implemented as software code to be executed by a processor using any suitable computer language such as, for example, Java, JavaScript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments and does not pose a limitation to the scope of the disclosure unless otherwise claimed. No language in the specification should be construed as indicating any non-claimed element as essential to each embodiment of the present disclosure.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the present subject matter is not limited to the embodiments described above or depicted in the drawings, and various embodiments and modifications can be made without departing from the scope of the claims below.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. A computing device, comprising:
a processor configured to execute instructions stored in a memory;
a hardware-based communication module means coupled to the processor and configured to communicate with one or more external computing devices through a computer network;
a software-based browser module means stored in the memory and configured to be executed by the processor and configured to establish a communication link to at least one of the one or more external computing devices using the communication module;
a software-based zone control module means stored in the memory configured to be executed by the processor and controlled by the browser module;
a first cache memory exclusively associated with a first zone of control and configured to store data associated with communications within the first zone of control via a first encrypted communication link such that access to the first cache memory from any other communication channel outside of the first zone of control is prevented; and
a second cache memory exclusively associated with a second zone of control and configured to store data associated with communications within the second zone of control via a second encrypted communication link such that access to the second cache memory from any other communication channel outside of the second zone of control is prevented;
wherein the zone control module further configured to:
establish a first zone of control having permission rules based on specific server locations wherein only certain types of files or sites are allowed to load from the first zone of control, the first zone of control isolating communications coordinated by the browser module based on a first user-generated customized criteria that identifies a first geographic region corresponding exclusively to a first physical location of at least a first one of the one or more external computing devices such that communications that originate outside of the first zone of control are restricted from accessing data generated by the communications within the first zone of control without impacting communications coordinated by the communication module; and
establish a second zone of control having permission rules based on specific server locations wherein only certain types of files or sites are allowed to load from the second zone of control, the second zone of control isolating communications coordinated by the browser module based on second user-generated customized criteria that identifies a second geographic region that is mutually exclusive of the first geographic region, the second geographic region corresponding exclusively to a second physical location of at least a second one of the one or more external computing devices such that communications that originate outside of the second zone of control are restricted from accessing data generated by the communications within the second zone of control without impacting communications coordinated by the communication module, the second permission rules based on the second geographic region wherein at least one file type does not have permission to be communication to the browser modules within the second zone of control.

2. The computing device of claim 1, wherein the communication link comprises a virtual private network communication link.

3. The computing device of claim 1, wherein at least one of the one or more external computing devices comprises a proxy server.

4. The computing device of claim 1, wherein the computer network comprises a private intranet.

5. The computing device of claim 1, wherein the first and second zones of control are based upon geographic distinctions among the one or more external computing devices.

6. The computing device of claim 1, wherein the first and second zones of control are based upon domain-level distinctions among the one or more external computing devices.

7. The computing device of claim 1, wherein the first and second zones of control are based upon user-generated customized distinctions among the one or more external computing devices.

8. The computing device of claim 1, further comprising a third zone of control that allows communications with a set of external computing devices that is mutually exclusive with respect to external computing devices associated with the first and second zones of control.

9. A computing system, comprising:
a first computing device configured to communicate data through a computer network;
a second computing device configured to communicate with the first computing device through the computer network, the second computing device further comprising:
a processor configured to execute instructions stored in a memory;
a hardware-based communication module means coupled to the processor and configured to facilitate communications with the second computing device through the computer network;
a software-based browser module means stored in the memory and configured to be executed by the processor and configured to establish a communication link to the second computing device using the communication module;
a software-based zone control module means stored in the memory configured to be executed by the processor and controlled by the browser module;
a first cache memory exclusively associated with a first zone of control and configured to store data associated with communications within the first zone of control via a first encrypted communication link such that access to the cache memory from any other communication channel outside of the first zone of control is prevented; and a second cache memory exclusively associated with a second zone of control and configured to store data associated with communications within the second zone of control via a second encrypted communication link such that access to the cache memory from any other communication channel outside of the second zone of control is prevented;

wherein the zone control module further configured to:
establish a first zone of control having permission rules based on specific server locations wherein only certain types of files or sites are allowed to load from the first zone of control, the first zone of control isolating communications coordinated by the browser module based on a first user-generated customized criteria that identifies a first geographic region corresponding exclusively to a first physical location of at least a first one of the one or more external computing devices such that communications that originate outside of the first zone of control are restricted from accessing data generated by the communications within the first zone of control without impacting communications coordinated by the communication module; and establish a second zone of control having permission rules based on specific server locations wherein only certain types of files or sites are allowed to load from the second zone of control, the second zone of control isolating communications coordinated by the browser module based on second user-generated customized criteria that identifies a second geographic region that is mutually exclusive of the first geographic region, the second geographic region corresponding exclusively to a second physical location of at least a second one of the one or more external computing devices such that communications that originate outside of the second zone of control are restricted from accessing data generated by the communications within the second zone of control without impacting communications coordinated by the communication module, the second permission rules based on the second geographic region wherein at least one file type does not have permission to be communication to the browser modules within the second zone of control.

10. The computer system of claim 9, wherein the second computing device comprises a mobile computing device.

11. The computer system of claim 9, wherein the first computing device comprises a server computing device.

12. The computer system of claim 9, further comprising a third computing device configured to communicate with the second computing device outside of the first and second zones of control.

13. The computer system of claim 9, further comprising proxy server computing device coupled between the first computing device and the second computing device and within one of the first and second zones of control.

14. The computer system of claim 9, further comprising a third computing device that is within a third zone of control wherein the third zone of control isolates communications coordinated by the browsing module that occur outside of the third zone of control and restricts other computing devices outside of the third zone of control from accessing data generated by the communications within the third zone of control without impacting communications in the first and second zones of control.

15. A computer-based method, comprising:
instantiating a browser having a private encrypted communication channel;
establishing a first zone of control associated with the instantiated browser and associated with a first encrypted communication link, the first zone of control having permission rules based on specific server locations wherein only certain types of files or sites are allowed to load from the first zone of control, the first zone of control isolating communications coordinated by the browser module based on a first user-generated customized criteria that identifies a first geographic region corresponding exclusively to a first physical location of at least a first one of the one or more external computing devices such that communications that originate outside of the first zone of control are restricted from accessing data generated by the communications within the first zone of control without impacting communications coordinated by the communication module; and
simultaneously establishing a second zone of control associated with the instantiated browser and associated with a second encrypted communication link, the second zone of control having permission rules based on specific server locations wherein only certain types of files or sites are allowed to load from the second zone of control, the second zone of control isolating communications coordinated by the browser module based on second user-generated customized criteria that identifies a second geographic region that is mutually exclusive of the first geographic region, the second geographic region corresponding exclusively to a second physical location of at least a second one of the one or more external computing devices such that communications that originate outside of the second zone of control are restricted from accessing data generated by the communications within the second zone of control without impacting communications coordinated by the communication module, the second permission rules based on the second geographic region wherein at least one file type does not have permission to be communication to the browser modules within the second zone of control;
isolating communications coordinated by the instantiated browser that occur outside of the first and second zones of control from communication that occur within one of the first and second zones of control;
isolating communications coordinated by the instantiated browser that occur within of the first zone of control from communication that occur within the second zone of control;
storing data from within the respective zones of control in respective exclusive isolated memory caches associated with the respective zone of control and associated with the respective encrypted communication links; and
restricting the data coordinated by the instantiated browser within the first and second zones of control from access by communication or computation occurring outside of the first and second zones of control without impacting communications outside of the first and second zones of control.

16. The method of claim 15, further comprising instantiating a second browser to coordinate communication outside of the first and second zones of control.

17. The method of claim 15, further comprising establishing a third zone of control exclusive from the first and second zones of control.

\* \* \* \* \*